United States Patent
Ferrier et al.

(10) Patent No.: US 11,290,815 B2
(45) Date of Patent: Mar. 29, 2022

(54) METHOD FOR PERSONALIZING THE AUDIO SIGNAL OF AN AUDIO OR VIDEO STREAM

(71) Applicant: Audus B.V., Wassenaar (NL)

(72) Inventors: Marciano Benito Ferrier, Wassenaar (NL); Elmer Diederik Bol, Wassenaar (NL); Sukhjinder Singh, Wassenaar (NL)

(73) Assignee: AUDUS B.V., Wassenaar (NL)

( * ) Notice: Subject to any disclaimer, the term of this patent is extended or adjusted under 35 U.S.C. 154(b) by 0 days.

(21) Appl. No.: 17/054,088

(22) PCT Filed: May 9, 2019

(86) PCT No.: PCT/NL2019/050277
§ 371 (c)(1),
(2) Date: Nov. 9, 2020

(87) PCT Pub. No.: WO2019/216767
PCT Pub. Date: Nov. 14, 2019

(65) Prior Publication Data
US 2021/0243526 A1    Aug. 5, 2021

(30) Foreign Application Priority Data
May 9, 2018    (NL) ...................................... 2020909

(51) Int. Cl.
| H04R 3/04 | (2006.01) |
| H04L 65/80 | (2022.01) |
| H04R 5/04 | (2006.01) |
| H04R 29/00 | (2006.01) |

(52) U.S. Cl.
CPC ............... *H04R 3/04* (2013.01); *H04L 65/80* (2013.01); *H04R 5/04* (2013.01); *H04R 29/001* (2013.01)

(58) Field of Classification Search
USPC ............. 381/23.1, 26, 60, 98, 309, 367, 370
See application file for complete search history.

(56) References Cited

U.S. PATENT DOCUMENTS

| 9,055,897 B2 | 6/2015 | Choi |
| 2007/0195963 A1 | 8/2007 | Ko et al. |
| 2013/0108096 A1 | 5/2013 | Fitz |

(Continued)

FOREIGN PATENT DOCUMENTS

| EP | 1946611 B1 | 5/2010 |
| EP | 3131314 A1 | 2/2017 |

(Continued)

OTHER PUBLICATIONS

International Search Report dated Sep. 4, 2019 for PCT/NL2019/050277.

*Primary Examiner* — Yosef K Laekemariam
(74) *Attorney, Agent, or Firm* — Suiter Swantz pc llo

(57) ABSTRACT

The invention relates to a method for personalizing the audio signal of an audio or video stream, comprising:
sending the audio or video stream from a server to a client over a communications network,
processing the audio signal by means of a processing unit to match an optimal hearing profile of a user listening to the audio at the client,
characterized in that the processing unit is arranged at the server or in the communications network, between the server and the client.

20 Claims, 1 Drawing Sheet

(56) References Cited

U.S. PATENT DOCUMENTS

2014/0233744 A1     8/2014   Risberg et al.
2016/0142538 A1     5/2016   Bredikhin et al.
2017/0347181 A1*   11/2017   Campbell ............. G06F 16/636

FOREIGN PATENT DOCUMENTS

| WO | 2006075264 A1 | 7/2006 | | |
|----|---------------|--------|---|---|
| WO | 2016153825 A1 | 9/2016 | | |
| WO | 2017040327 A1 | 3/2017 | | |
| WO | 2018007631 A1 | 1/2018 | | |
| WO | WO 2018007631 | * | 1/2018 | ............. H04R 25/00 |

* cited by examiner

METHOD FOR PERSONALIZING THE AUDIO SIGNAL OF AN AUDIO OR VIDEO STREAM

FIELD OF THE INVENTION

The present invention relates to a method for personalizing the audio signal of an audio or video stream.

BACKGROUND OF THE INVENTION

WO 2017/040327 A1 discloses personalizing an audio signal so that the user perceives the audio signal as if the user had ideal hearing and/or desired hearing. In one embodiment, headphones on a users head include a sensor and a speaker. While the speaker plays an audio signal to the user, the sensor records the users response to the audio signal. The sensor can be a microphone, a brainwave sensor, an EEG sensor, et cetera. The users response can be the audio response inside the users ear, the brainwave response associated with the user, electrical skin response associated with the user, et cetera. Based on the measured response, and based on the knowledge of how other people perceive sound, the audio signal is modified to compensate for the difference between the users hearing and the ideal hearing and/or desired hearing, therefore increasing the users enjoyment of sound.

WO 2016/153825 A1 discloses a combination of a hearing test, audio signal compensation, and signal processing algorithms implemented jointly in an audio device. An audio signal is processed and tuned within the entire range of audible frequencies to actively compensate for both the characteristics of the listening device, and the specific hearing characteristics of the listener, resulting in an improved music listening experience.

EP 1,946,611 B1 discloses a method to adjust a hearing aid device, the method comprising generating one or more acoustic signals (S2) to induce otoacoustic emissions (OAE) in an inner ear (UIE) of a user of the device, measuring the otoacoustic emissions (OAE) and adjusting the hearing aid device based on a result from the measurement of the otoacoustic emissions (OAE), wherein the inducing and/or measuring of the otoacoustic emissions is at least partly carried out by the hearing aid device.

WO 2006/075264 A1 discloses a method for the frequency-dependent amplifying of the sound level of audio signals.

US 2007/0195963 A1 discloses adjusting sound using biometrical information provided by measuring a response of a human's ear to a test signal, comparing the measured response with a target response, obtaining deviations between the measured response and the target response, and adjusting sound using the obtained deviations.

US 2014/0233744 A discloses a system and method for enhancing the audio experience on a consumer electronic device. The system includes a parametrically configurable processing block. An audio enhancement system suitable for embedding into a low cost, low power application specific integrated circuit is also disclosed.

EP 3,131,314 A1 discloses a method and device for processing an audio output in consideration of the hearing characteristics of a user and the characteristics of an audio device connected to an electronic device.

U.S. Pat. No. 9,055,897 B2 discloses a method of measuring an otoacoustic emission (OAE).

It is thus known in the art to adapt an audio signal so that the user perceives the audio signal as if the user had ideal hearing and/or desired hearing, for instance by measuring an OAE and adjusting the audio output of a speaker or hearing device accordingly to match the user's hearing. However, a problem with the methods and devices according to the above mentioned prior art is that the processing of the audio signal into a signal matching the user's sound perception requires substantial amounts of processing power. This processing generally is carried out by a processor (CPU) or processing unit comprised by a speaker, hearing device, headphone, multimedia device, et cetera, owned by the user, or arranged at the user's location. In practice, this leads to significantly decreased battery life, an overly complex user device, high cost, and, above all, high CPU loads, in particular when streaming audio.

Furthermore, when the user carries a hearing aid or the like, to process the audio signal into a signal matching the user's optimal sound perception, the user's comfort is relatively low because of the additional weight of the hearing aid in or on the user's ear. Additionally, the carrying of a hearing aid often leads to stigmatization of the user.

OBJECT OF THE INVENTION

An object of the invention is therefore to provide a method for personalizing an audio signal into a signal matching the user's sound perception, in particular when streaming audio, wherein the battery life of the device at the user's side is increased, wherein the user device can be simplified, and most importantly, wherein high CPU loads can be prevented.

Another object of the invention is to prevent the user from having to carry a hearing aid in or on his ear when listening to the audio or video stream.

DESCRIPTION OF THE INVENTION

Hereto, the method according to the invention is characterized in that the processing unit is arranged at the server or in the communications network, between the server and the client, i.e. the processing unit is not situated at the client (side) of the communications network or on the user device. According to the invention, the personalized audio signal matching the optimal hearing profile of the user is thus broadcast together with, or embedded within, the audio signal of the audio or video stream.

Due to the processing of the audio signal into a signal matching the user's sound perception (for the most part) not taking place at the client side of the communications network, the amount of processing power required at the user side is significantly reduced. The processing no longer has to be carried out by a processor (CPU) or processing unit comprised by a speaker, hearing device, headphone, multimedia device, et cetera, owned by the user, or arranged at the user's location.

This leads to significantly increased battery life, a relatively less complex user device, lower cost, and, lower CPU loads, in particular when streaming audio or video.

In this respect, it should be noted that EP 3,131,314 A1 discloses a method and device for processing an audio output in consideration of the hearing characteristics of a user, wherein the processing still primarily takes place on the electronic device carried by the user, whereas with the present invention the device of the user is basically not at all used for processing audio according to the optimal hearing characteristics of the user, i.e. substantially 100% of audio processing in line with the optimal hearing profile takes place somewhere else (on the server or at a position between the server and the client). The disclosure of EP 3,131,314 A1 thus does not provide the benefits of the present invention.

Furthermore, the user does not have to carry a hearing aid as often as before, because the signal matching the user's optimal sound perception is broadcast along with the audio or video stream and the speaker or headphones, et cetera, at the user's side can be used to make the optimal audio signal audible to the user, without the need for a separate hearing aid. Basically, the speaker or headphone of the user's device has thus effectively become the hearing aid of the user.

It should be understood that, within the context of this patent application, the user device can be constituted by a speaker, hearing device, headphone, multimedia device, car phone, car multi media center, car display, television, smartphone, et cetera, owned by the user, or arranged at the user's location to make the audio signal audible to the user, such as via a speaker or headphones. The processing unit being arranged between the server and the client means that the processing unit is arranged somewhere in the communications path between the server and the client.

The audio or video stream can be, for example, spoken text, music, book readings, and/or a voice over IP conference call, a phone call, audio from a live conversation, etc.

Personalizing the audio signal of an audio or video stream according to the present invention can be useful during (long range) conference calls through platforms like, for instance, Skype, or Zoom, or Gotomeeting.

The audio signal can be processed in real-time or near real time with a certain delay, such as 1-30 seconds, for example 1-20 seconds, for instance 1-10 seconds or 1-5 seconds of delay or even less than tenths of a second of delay. For instance, an audio or video stream sent in real-time to the user device can be re-routed to the processing unit over the communications network to be processed and then sent back to the user device, which will inherently lead to some delay. The audio signal can also be processed non-real time. In this case the audio signal is processed, wherein the processed audio signal is stored for later use. This way it is possible that there is a considerably larger time gap between processing and listening to the processed audio signal by the user, for example, hours, days, weeks, months, or even years, after the audio signal has been processed. This is useful for media, such as films or music tracks, stored in a database.

An embodiment relates to an aforementioned method, wherein the communications network is a cloud computing network. Thus, processing of the audio signal can take place basically anywhere in the world, for instance via the Internet, on a server having sufficient processing power available to allow for smooth audio signal processing.

An embodiment relates to an aforementioned method, wherein the optimal hearing profile is established by measuring the response of one or two of the user's ears to a test signal, comparing the measured response to a target response, obtaining deviations between the measured response and the target response, and adjusting the audio signal based on the obtained deviations. Thus, the deviations can then be used by the processing unit to adapt the audio signal to match the optimal hearing profile of the user. Preferably, the audio characteristics (in particular any distortion) of the speaker, headphone, earplug or the like, i.e. the user device that emits the final audio signal to the user's ear or ears, is taken into account.

An embodiment relates to an aforementioned method, wherein the optimal hearing profile is stored on a (non-transient) storage device, preferably on the user device. This way, the user has his or her optimal hearing profile within arm's reach. Of course, it is important that the processing unit can access the optimal hearing profile when needed.

An embodiment relates to an aforementioned method, wherein the storage device is a storage server, a computer, such as a personal computer or a handheld computer, a mobile communications device, a multimedia device, a smartphone, or a tablet, or any other storage device such as, for example, a hard drive in a car. Of course, the storage device should be connected to or connectable to the communications network.

An embodiment relates to an aforementioned method, wherein the optimal hearing profile is stored as a personalized code, such as a QR-code. Thus, when the user wants to listen to an audio stream or, for that matter, wants to view a video stream, he or she can just scan the QR-code and the optimal hearing profile is sent to and recognized by the processing unit and the audio signal is adapted accordingly.

An embodiment thus relates to an aforementioned method, wherein the processing unit accesses the storage device over the communications network, for instance over 3G or 4G, or 5G, via a cabled network, the Internet, a cloud computing network, a wireless network, et cetera.

An embodiment relates to an aforementioned method, wherein the optimal hearing profile comprises a frequency response of one or both of the user's ears. The frequency response is the most important characteristic of the hearing profile. Of course, other characteristics can also be measured, if desired. The frequency response may be stored, and used for creating the personal hearing profile. Additionally, other characteristics can be stored, such as, for example, user preferences, room characteristics such as background noise and/or acoustic room quality, et cetera.

An embodiment relates to an aforementioned method, wherein the optimal hearing profile is established by means of otoacoustic emissions (OAE), preferably by an OAE test device at the user's side, such as on the user device.

An embodiment relates to an aforementioned method, wherein the optimal hearing profile is established by means of a test device or software test program at the client or on the user device.

An embodiment relates to an aforementioned method, wherein the test device or software test program is connected to, or comprised by, a computer with a user interface, such as a personal computer or a handheld computer, a mobile communications device, a multimedia device, a smartphone or a tablet. This way, tests such as, for example, audiograms performed by a professional, such as an audiologist, doctor, et cetera, can be inputted manually, wherein a profile can be created directly.

An embodiment relates to an aforementioned method, wherein a first, earlier optimal hearing profile is established, as well as a second, later optimal hearing profile and a difference between the first and second optimal hearing profiles is determined. The optimal hearing profile can be, for example regularly, updated over a certain period of time such as, for example, a month, a multiple months, a year, or multiple years. In this case, the act of creating an optimal hearing profile is repeated in order to establish an updated optimal hearing profile. The updating can be performed by testing the user's hearing automatically or based on input from the user.

An embodiment relates to an aforementioned method, comprising the step of forecasting a third, future, optimal hearing profile based on the difference between the first and second optimal hearing profiles. The future optimal hearing profile can be stored in a database. It is expected that a user's hearing will deteriorate over time. By initially establishing a user's optimal hearing profile, and after a certain amount of time, updating the user's optimal hearing profile, a forecast of further deterioration of the user's hearing can be made based on a comparison of the optimal hearing profile with the updated hearing profile. The accuracy of the future optimal hearing profile can be improved by using multiple updated optimal hearing profiles over time.

An embodiment relates to an aforementioned method, comprising the step of predicting the optimal hearing profile based on estimated hearing deterioration data. Such data can encompass, for example, age, gender, environmental factors, profession, et cetera. ISO 7029:2017 provides descriptive statistics of the hearing threshold deviation for populations of otologically normal persons of various ages under monaural earphone listening conditions. It is also possible that the deterioration data is used in combination with a hearing test. The inventors contemplate that when the deterioration data is used in combination with a hearing test a more accurate optimal hearing profile can be provided.

An embodiment thus relates to an aforementioned method, wherein the audio signal is processed in real-time, such as during VOIP, Zoom or Skype conferencing.

An embodiment thus relates to an aforementioned method, wherein substantially 100% of the audio signal processing takes place at the processing unit arranged at the server or in the communications network, between the server and the client.

An embodiment furthermore relates to an aforementioned method, wherein multiple users associated with multiple clients are present and the processing unit processes the audio signal to match the optimal hearing profile of each individual user listening to the audio at the associated client, such that each user experiences individually optimized audio.

An embodiment relates to an aforementioned method, wherein multiple processing units are arranged at the server or in the communications network, between the server and the client, to distribute processing loads when e.g. many users are participating in a video conference or the like and real-time, individually optimized audio is desired.

Another aspect of the invention relates to a storage device for use with the aforementioned method, for instance as a storage server, a computer, such as a personal computer or a handheld computer, a mobile communications device, a multimedia device, a smartphone or a tablet, comprising the optimal hearing profile.

An embodiment relates to an aforementioned storage device, wherein the optimal hearing profile is stored as a personalized code, such as a QR-code.

An embodiment relates to an aforementioned storage device, wherein the storage device can be accessed by the processing unit over the communications network.

Another aspect of the invention concerns a test device or software test program for establishing the optimal hearing profile of the user, for use with the aforementioned method, for connection to, or to be comprised by, a computer, such as a personal computer or a handheld computer, a mobile communications device, a multimedia device, a smartphone or a tablet.

BRIEF DESCRIPTION OF THE DRAWINGS

The present invention will be explained hereafter with reference to exemplary embodiments of the method, a test device and a software program according to the invention and with reference to the drawings. Therein.

DETAILED DESCRIPTION

Figure 1:
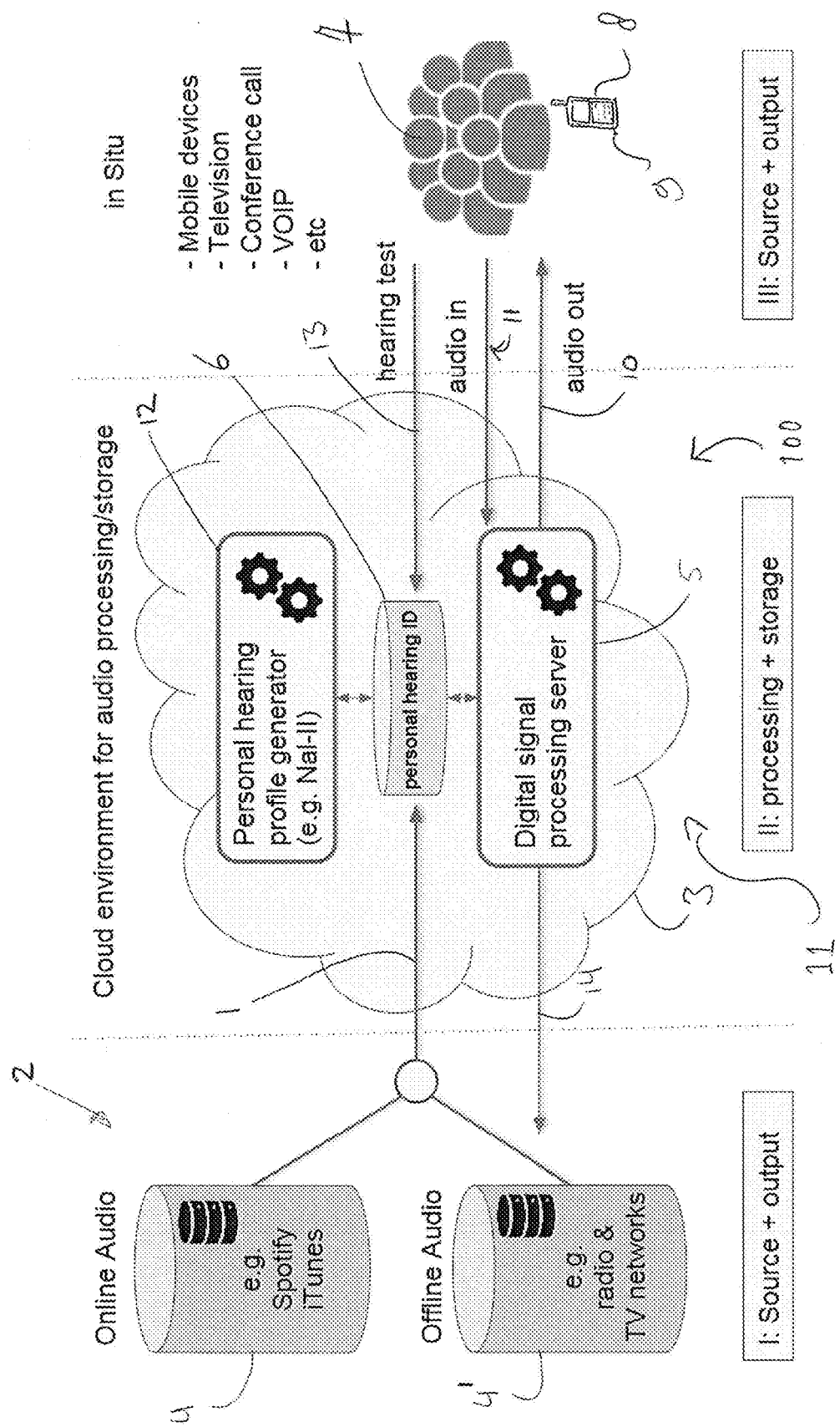
FIG. 1 shows a flowchart of an exemplary embodiment of the method according to the present invention.

FIG. 1 shows an exemplary embodiment of a method 100 for personalizing the audio signal 1 of an audio or video stream. The method 100 comprises the steps of sending, the audio or video stream from a server 2 to a client 9 over a communications network 11, such as the Internet, processing the audio signal 1 by means of a processing unit 3 to match an optimal hearing profile 6 of a user 7 listening to the audio 10 at the client 9. The processing unit 3 of the method 100 is arranged at the server 2 or in the communications network 11, between the server 2 and the client 9.

As schematically shown in FIG. 1, the to be streamed audio 1 is stored in a server 2 comprising a database 4, 4'. This database 4, 4' can be an online (4) and/or and offline (4') database which forms the source of the audio signal 1. Offline audio could for instance be constituted by radio and TV networks. Online audio could for instance comprise Spotify, YouTube, iTunes, VOIP conferencing or similar types of services/data, such as online gaming services, navigation services, et cetera. Therein, it is conceivable that multiple interacting users 7 (instead of one), i.e. multiple clients 9, use the respective service at the same time, with their own, unique personal hearing ID's. The processing unit(s) 3 may then process the mutually exchanged audio signals in such a way, that each user 7 experiences individually optimized audio.

The database 4, 4' is communicatively connected to a processing unit 3 in a cloud environment. The processing unit 3 comprises a personal hearing profile generator 12, a personal hearing ID unit 6, and a digital signal processing server 5. Alternatively, the personal hearing ID can be stored outside of the cloud. The personal hearing ID can furthermore conveniently be coupled to a general user profile used to register with the aforementioned software services, such that, for instance when logging in on YouTube with the general user profile for this respective service, the personal hearing ID is automatically used or activated and the YouTube audio stream is automatically optimized for the respective user 7. The personal hearing profile generator 12 is connected to the personal hearing ID unit 6. The personal hearing ID unit 6 is communicatively connected to the user's user device 8, the database 4, 4', and the digital signal processing server 5. The digital signal processing server 5 is communicatively connected to the user device 8 and the database 4, 4'.

The user device 8 of the user 7 communicates with the processing unit 3 via the personal hearing ID unit 6, and the digital signal processing server 5.

A user's 7 personal hearing ID can, for example, be generated by the processing unit 3 through the user device 8. The processing unit 3 can, for example, send an audio output 10 to the user device 8 of a user 7 in the form of a test signal (OAE). The test signal is then transmitted via a transmitter, such as a speaker, of the user device 8 towards the inner parts of the user's 7 ear. In reaction to the test signal, the ear of the user 7 emits an otoacoustic emission which is picked up by a receiver of the user device 8. The signal of the user's 7 ear that was received by the user device 8 is then transmitted to the personal hearing ID unit 6 of the processing unit 3 via communicative connection 13. Multiple test signals in combination with the associated otoacoustic emissions are used by the personal hearing profile generator 12 of the processing unit 3 to generate a personal hearing ID of the user 7. The personal hearing profile generator 12 can compensate/calculate the losses per frequency range via known algorithms, such as NAL-NL1, NAL-NL2, "Half Gain Rule", et cetera, to allow for fitting/calculating the filters based on the desired audio output.

It is also possible that the personal hearing ID 6 is inputted into the processing unit 3 manually or chosen based on information, such as deterioration data comprising, for example, age and gender, about the user 7.

Alternatively, it is possible to establish a user's 7 personal hearing ID more interactively. In this case test signals are transmitted via the user device 8 to the inner parts of the user's 7 ear, wherein the user 7 needs to respond, after hearing each test signal, by pushing a button, for instance, on the device 8. Based on multiple test signals in combination with the user's associated responses, the personal hearing profile generator 12 of the processing unit 3 generates a personal hearing ID of the user 7. The profile generator 12 can compensate/calculate the losses per frequency range via algorithms, such as NAL-NL1, NAL-NL2, "Half Gain Rule", et cetera.

It is also possible to combine any or all of the above methods for generating the personal hearing ID and/or compare results in order to improve accuracy of the personal hearing ID.

In order to generate a personal hearing ID, multiple test signals are sent to the user 7. A user 7 is in general capable of hearing sounds within a frequency range of 20 to 20.000 Hz, wherein some subranges are better heard by the user 7 than others. At some frequencies the user 7 might even be entirely non-responsive. By sending the user 7 multiple test signals within specific subranges, a deviation in hearing capacity among subranges, i.e. subranges that generate none or less (otoacoustic) response, can be identified. This information is used by the personal hearing profile generator 12 to create a personal hearing ID wherein the deviation among subranges is stored. Based on the personal hearing ID of the user, the digital signal processing server 5 can adjust the audio 10 at certain frequencies to correspond to the user's personal hearing ID. In other words, the volume of the audio output 10 can be increased at frequencies where the user's hearing is relatively bad, whereas the volume of the audio output 10 can be decreased at frequencies where the user's hearing is relatively adequate, such that the user can experience the audio output 10 in an optimal way in line with the user's 7 hearing capacity.

The user device 8 may comprise, for example, a mobile device, such as a smartphone, or a television, or a desktop, or a laptop, whether or not including a headset, or headphones. The personal hearing ID can, for instance, be established via Voice over IP (VOIP).

It is possible that the user device 8 comprises a virtual assistant or chatbot, such as for example, Apple Siri, Microsoft Cortana, Amazon Alexa, Google Assistant, to interact with the user.

When a personal hearing ID is established, the digital signal processing server 5 of the processing unit 3 can output audio 10 to the user device 8 based on a match between the audio signal of an audio or video stream and the hearing profile of the specific user 7.

According to an embodiment of the present invention, the process of establishing a personal hearing ID can be repeated over time. For instance, after a week, a month, a year, or even several years. This way, a trend in a user's hearing capacity can be identified, which can be used to estimate a user's future personal hearing ID. Similarly, such trends or analyses could be used to give the user 7 advice regarding his hearing capacity. For instance, if the user's hearing is found to deteriorate for a certain frequency range, the user could be advised to increase the volume for that specific frequency range. If the volume needs to be boosted too much, the user could for instance be advised to see a medical practitioner.

It should be clear that the description above is intended to illustrate the operation of preferred embodiments of the invention, and not to reduce the scope of protection of the invention. Starting from the above description, many embodiments will be conceivable to the skilled person within the inventive concept and scope of protection of the present invention.

LIST OF REFERENCE NUMERALS

1. Audio or video stream
2. Server
3. Processing unit
4. Database
5. Signal processing server
6. Personal hearing ID unit
7. User
8. User device
9. Client
10. Output audio
11. Communications network
12. Hearing profile generator

The invention claimed is:

1. A method for personalizing the audio signal of an audio or video stream, comprising:
    sending the audio or video stream from a server to a client over a communications network,
    processing the audio signal by means of a processing unit to match an optimal hearing profile of a user listening to the audio at the client,
    wherein the processing unit is arranged at the server or in the communications network, between the server and the client, characterized in that the optimal hearing profile is established by means of otoacoustic emissions (OAE), wherein the optimal hearing profile is generated by the processing unit through a user device at the client, wherein the processing unit sends an audio output to the user device of a user in the form of an otoacoustic emission test signal, wherein the test signal is transmitted via a transmitter of the user device towards inner parts of the user's ear, wherein, in reaction to the otoacoustic emission test signal, the ear of the user emits an otoacoustic emission which is picked up by a receiver of the user device, wherein the signal of the user's ear that was received by the user device is then transmitted to a personal hearing ID unit of the processing unit via a communicative connection, wherein multiple test signals in combination with the associated otoacoustic emissions are used by a personal hearing profile generator of the processing unit to generate the optimal hearing profile of the user.

2. The method according to claim 1, wherein the communications network is a cloud computing network.

3. The method according to claim 1, wherein the optimal hearing profile is stored on a storage device.

4. The method according to claim 3, wherein the storage device is a storage server, a computer, a personal computer or a handheld computer, a mobile communications device, a multimedia device, a smartphone or a tablet.

5. The method according to claim 3, wherein the optimal hearing profile is stored as a personalized code.

6. The method according to claim 3, wherein the processing unit accesses the storage device over the communications network.

7. The method according to claim 1, wherein the optimal hearing profile comprises a frequency response of one or both of the user's ears.

8. The method according to claim 1, wherein the optimal hearing profile is established by means of a test device at the client.

9. The method according to claim 8, wherein the test device is connected to, or comprised by, a computer, a personal computer or a handheld computer, a mobile communications device, a multimedia device, a smartphone or a tablet.

10. The method according to claim 1, wherein a first, earlier optimal hearing profile is established, as well as a second, later optimal hearing profile and a difference between the first and second optimal hearing profiles is determined.

11. The method according to claim 10, comprising the step of forecasting a third, future optimal hearing profile based on the difference between the first and second optimal hearing profiles.

12. The method according to claim 1, comprising the step of predicting the optimal hearing profile based on estimated hearing deterioration data.

13. The method according to claim 1, comprising the step of forecasting a third, future, optimal hearing profile based on estimated hearing deterioration data.

14. The method according to claim 1, wherein the audio signal is processed in real-time.

15. The method according to claim 1, wherein substantially 100% of the audio signal processing takes place at the processing unit arranged at the server or in the communications network, between the server and the client.

16. The method according to claim 1, wherein multiple users associated with multiple clients are present and the processing unit processes the audio signal to match the optimal hearing profile of each individual user listening to the audio at the associated client.

17. The method according to claim 1, wherein multiple processing units are arranged at the server or in the communications network, between the server and the client.

18. A storage device, comprising an optimal hearing profile for use with personalizing the audio signal of an audio or video stream, comprising:
sending the audio or video stream from a server to a client over a communications network,
processing the audio signal by means of a processing unit to match an optimal hearing profile of a user listening to the audio at the client,
wherein the processing unit is arranged at the server or in the communications network, between the server and the client, wherein the optimal hearing profile has been established by means of otoacoustic emissions (OAE), wherein the optimal hearing profile has been generated by the processing unit through the user device at the client, wherein the processing unit has sent an audio output to the user device of the user in the form of an otoacoustic emission test signal, wherein the test signal has been transmitted via a transmitter of the user device towards inner parts of the user's ear, wherein, in reaction to the otoacoustic emission test signal, the ear of the user has emitted an otoacoustic emission which has been picked up by the receiver of the user device, wherein the signal of the user's ear that was received by the user device has then been transmitted to the personal hearing ID unit of the processing unit via a communicative connection, wherein multiple test signals in combination with the associated otoacoustic emissions have been used by the personal hearing profile generator of the processing unit to generate the optimal hearing profile of the user,
wherein the optimal hearing profile of the user is stored on the storage device.

19. The storage device according to claim 18, wherein the optimal hearing profile is stored as a personalized code.

20. A test device for establishing an optimal hearing profile of a user, for use with personalizing the audio signal of an audio or video stream, comprising:
sending the audio or video stream from a server to a client over a communications network,
processing the audio signal by means of a processing unit to match an optimal hearing profile of a user listening to the audio at the client,
characterized in that the processing unit is arranged at the server or in the communications network, between the server and the client,
the test device, being for connection to, or to be comprised by, a computer, a personal computer or a handheld computer, a mobile communications device, a multimedia device, a smartphone or a tablet, the test device being configured for establishing the optimal hearing profile of the user at the client,
wherein the optimal hearing profile is established by means of otoacoustic emissions (OAE), wherein the optimal hearing profile is generated by the processing unit through the user device at the client, wherein the processing unit sends an audio output to the user device of the user in the form of an otoacoustic emission test signal, wherein the test signal is transmitted via a transmitter of the user device towards inner parts of the user's ear, wherein, in reaction to the otoacoustic emission test signal, the ear of the user emits an otoacoustic emission which is picked up by the receiver of the user device, wherein the signal of the user's ear that was received by the user device is then transmitted to the personal hearing ID unit of the processing unit via a communicative connection, wherein multiple test signals in combination with the associated otoacoustic emissions are used by the personal hearing profile generator of the processing unit to generate the optimal hearing profile of the user.

* * * * *